(12) United States Patent
Kawai et al.

(10) Patent No.: US 6,997,651 B2
(45) Date of Patent: Feb. 14, 2006

(54) END MILL HAVING DIFFERENT AXIAL RAKE ANGLES AND DIFFERENT RADIAL RAKE ANGLES

(75) Inventors: Ryogo Kawai, Toyohashi (JP); Jiro Osawa, Toyokawa (JP)

(73) Assignee: OSG Corporation, Toyokawa (JP)

( * ) Notice: Subject to any disclaimer, the term of this patent is extended or adjusted under 35 U.S.C. 154(b) by 26 days.

(21) Appl. No.: 10/759,008

(22) Filed: Jan. 20, 2004

(65) Prior Publication Data
US 2004/0170480 A1 Sep. 2, 2004

(30) Foreign Application Priority Data
Jan. 22, 2003 (JP) .............................. 2003-013115

(51) Int. Cl.
*B32C 5/10* (2006.01)
(52) U.S. Cl. ......................................... 407/53; 407/61
(58) Field of Classification Search .................. 407/53, 407/54, 61, 34; 408/230; B32B 5/10
See application file for complete search history.

(56) References Cited

U.S. PATENT DOCUMENTS

| | | | | |
|---|---|---|---|---|
| 2,377,329 A | * | 6/1945 | Dettmer | 407/53 |
| 4,560,308 A | * | 12/1985 | Deller | 407/53 |
| 5,094,573 A | * | 3/1992 | Hougen | 409/132 |
| 5,779,399 A | * | 7/1998 | Kuberski | 407/54 |
| 6,056,485 A | * | 5/2000 | Magill et al. | 407/54 |
| 6,435,780 B1 | * | 8/2002 | Flynn | 407/53 |
| 2002/0031409 A1 | * | 3/2002 | Sato et al. | 407/53 |

FOREIGN PATENT DOCUMENTS

JP Y2 2557189 8/1997

* cited by examiner

*Primary Examiner*—Boyer D. Ashley
*Assistant Examiner*—Sara Addisu
(74) *Attorney, Agent, or Firm*—Oliff & Berridge, PLC (57) ABSTRACT

An end mill including a cylindrical body having (a) flutes each formed in the cylindrical body and each extending from an axially distal end of the cylindrical body toward an axially proximal end of the cylindrical body, (b) peripheral cutting edges each provided by one of widthwise opposite edges of a corresponding one of the flutes, and (c) end cutting edges each located at the axially distal end of the cylindrical body and contiguous to a corresponding one of the peripheral cutting edges. The end cutting edges include first and second end cutting edges, while the peripheral cutting edges include first and second peripheral cutting edges which are contiguous to the first and second end cutting edges, respectively. A first axial rake angle of the first end cutting edge is smaller than a second axial rake angle of the second end cutting edge, while a first radial rake angle of the first peripheral cutting edge is larger than a second radial rake angle of the second peripheral cutting edge.

9 Claims, 8 Drawing Sheets

| FACTORS | LEVEL 1 | LEVEL 2 |
|---|---|---|
| A: RADIAL RAKE ANGLE | $\beta 1=6°, \beta 2=0°$ | $\beta 1=15°, \beta 2=6°$ |
| B: AXIAL RAKE ANGLE | $\alpha 1=0°, \alpha 2=6°$ | $\alpha 1=3°, \alpha 2=3°$ |
| C: CORE DIAMETER | cd1=0.6D, cd2=0.7D | cd1=0.65D, cd2=0.65D |
| D: MATERIAL | CEMENTED CARBIDE a | CEMENTED CARBIDE b |

FIG. 2B

| TRIAL PRODUCTS | A | B | A×B | C | A×C | e | D |
|---|---|---|---|---|---|---|---|
| No 1 | 1 | 1 | 1 | 1 | 1 | 1 | 1 |
| No 2 | 1 | 1 | 1 | 2 | 2 | 2 | 2 |
| No 3 | 1 | 2 | 2 | 1 | 1 | 2 | 2 |
| No 4 | 1 | 2 | 2 | 2 | 2 | 1 | 1 |
| No 5 | 2 | 1 | 2 | 1 | 2 | 1 | 2 |
| No 6 | 2 | 1 | 2 | 2 | 1 | 2 | 1 |
| No 7 | 2 | 2 | 1 | 1 | 2 | 2 | 1 |
| No 8 | 2 | 2 | 1 | 2 | 1 | 1 | 2 |

FIG. 2C

| TRIAL PRODUCTS | RADIAL RAKE ANGLE | | AXIAL RAKE ANGLE | | CORE DIAMETER | | MATERIAL |
|---|---|---|---|---|---|---|---|
| | $\beta 1$ | $\beta 2$ | $\alpha 1$ | $\alpha 2$ | cd1 | cd2 | |
| No 1 | 6° | 0° | 0° | 6° | 0.6D | 0.7D | CEMENTED CARBIDE a |
| No 2 | 6° | 0° | 0° | 6° | 0.65D | 0.65D | CEMENTED CARBIDE b |
| No 3 | 6° | 0° | 3° | 3° | 0.6D | 0.7D | CEMENTED CARBIDE b |
| No 4 | 6° | 0° | 3° | 3° | 0.65D | 0.65D | CEMENTED CARBIDE a |
| No 5 | 15° | 6° | 0° | 6° | 0.6D | 0.7D | CEMENTED CARBIDE b |
| No 6 | 15° | 6° | 0° | 6° | 0.65D | 0.65D | CEMENTED CARBIDE a |
| No 7 | 15° | 6° | 3° | 3° | 0.6D | 0.7D | CEMENTED CARBIDE a |
| No 8 | 15° | 6° | 3° | 3° | 0.65D | 0.65D | CEMENTED CARBIDE b |

FIG. 3

| TYPE OF TEST | PERFORMANCE TEST | DURABILITY TEST |
|---|---|---|
| WORK MATERIAL | SUS 304 | |
| CUTTING PATTERN | SLOTTING | |
| CUTTING FLUID | WATER SOLUBLE FLUID | |
| NUMBER OF REVOLUTIONS | 1900~4852min$^{-1}$ | 4852min$^{-1}$ |
| FEED RATE | 380~970mm/min | 776mm/min |
| DEPTH OF CUT (AXIAL DEPTH) | 0.5D~1D | 1D |

| FACTORS | SUM OF SQUARES | DEGREE OF FREEDOM | VARIANCE | F 0 | PROBABILITY |
|---|---|---|---|---|---|
| RADIAL RAKE ANGLE (A) | 1.531 | 1 | 1.531 | 1.22 | 0.385 |
| AXIAL RAKE ANGLE (B) | 3.001 | 1 | 3.001 | 2.39 | 0.262 |
| CORE DIAMETER (C) | 3.92 | 1 | 3.92 | 3.122 | 0.219 |
| A×B | 6.125 | 1 | 6.125 | 4.878 | 0.158 |
| A×C | 1.531 | 1 | 1.531 | 1.22 | 0.385 |
| ERROR (e) | 2.511 | 2 | 1.256 | | |
| SUM | 18.62 | 7 | | | |

FIG. 6

|  | ENDMILL OF THE INVENTION | ENDMILL OF COMPARATIVE EXAMPLE I | ENDMILL OF COMPARATIVE EXAMPLE II |
|---|---|---|---|
| NUMBER OF FLUTES | 4 | 3 | 4 |
| RADIAL RAKE ANGLE | $\beta 1=15°, \beta 2=6°$ | $\beta 1=18°, \beta 2=18°$ | $\beta 1=6°, \beta 2=6°$ |
| AXIAL RAKE ANGLE | $\alpha 1=0°, \alpha 2=6°$ | $\alpha 1=2°, \alpha 2=2°$ | $\alpha 1=3°, \alpha 2=3°$ |
| CORE DIAMETER | cd1=0.65D, cd2=0.65D | cd1=0.45D, cd2=0.45D | cd1=0.67D, cd2=0.67D |
| HELIX ANGLE | 40° | 35° | 50° |

END MILL HAVING DIFFERENT AXIAL RAKE ANGLES AND DIFFERENT RADIAL RAKE ANGLES

BACKGROUND OF THE INVENTION

1. Field of the Invention

The present invention relates in general to an end mill, and more particularly to such an end mill capable of exhibiting an excellent durability even in its use for cutting a tough work material, for example, a heat resistant alloy such as kovar, inconel and stainless steel.

2. Discussion of the Related Art

There is known a square end mill including a cylindrical body made of a cemented carbide and having (a) a plurality of flutes, (b) a plurality of peripheral cutting edges which are provided by the respective flutes, and (c) a plurality of end cutting edges which are located at the axially distal end of the cylindrical body and are contiguous to the respective peripheral cutting edges. As an example of such a square end mill, JP-Y2-2557189 (publication of Japanese Utility Model issued in 1997) discloses an end mill in which one of the plurality of peripheral cutting edges has a radial rake angle smaller than that of each of the other peripheral cutting edges while one of the plurality of end cutting edges extends so as to substantially reach an axis of the cylindrical body. The end cutting edge, substantially reaching the axis, serves as a so-called "center cutting edge", and has a shape different from that of each of the other end cutting edges as seen in a bottom view of the end mill. The center cutting edge has a negative radial rake angle, namely, is inclined such that its radially outer end is located rearward of its radially inner end as viewed in a rotating direction of the end mill, while each of the other end cutting edges has a positive radial rake angle, so that an easy breakage of the center cutting edge can be prevented without suffering from a chattering which would deteriorate the surface finish and machining accuracy.

However, even the end mill as disclosed in JP-Y2-2557189 is not capable of exhibiting a sufficiently high degree of durability when it is used for cutting a tough work material such as a heat resistant alloy (e.g., kovar, inconel and stainless steel). Since such a tough work material inherently tends to produce chips not easily broken into small pieces, a large cutting resistance acts on the end mill during the cutting of the tough work material, causing a chattering and chipping of the cutting edges. Thus, the durability of the end mill is deteriorated when used for the tough work material. For preventing the deterioration in the durability of the end mill, the cutting speed such as a feed rate has to be reduced.

SUMMARY OF THE INVENTION

It is therefore an object of the present invention to provide an end mill which is capable of exhibiting a sufficiently high degree of durability even in its use for cutting a tough work material, for example, a heat resistant alloy such as kovar, inconel and stainless steel. This object may be achieved according to any one of first through ninth aspects of the invention which are described below.

The first aspect of this invention provides an end mill comprising: a cylindrical body having (a) a plurality of flutes each of which is formed in the cylindrical body and each of which extends from an axially distal end of the cylindrical body toward an axially proximal end of the cylindrical body, (b) a plurality of peripheral cutting edges each of which is provided by one of widthwise opposite edges of a corresponding one of the plurality of flutes, and (c) a plurality of end cutting edges each of which is located at the axially distal end of the cylindrical body and is contiguous to a corresponding one of the plurality of peripheral cutting edges, wherein the plurality of end cutting edges include first and second end cutting edges, while the plurality of peripheral cutting edges include first and second peripheral cutting edges which are contiguous to the first and second end cutting edges, respectively, and wherein a first axial rake angle of the first end cutting edge is smaller than a second axial rake angle of the second end cutting edge, while a first radial rake angle of the first peripheral cutting edge is larger than a second radial rake angle of the second peripheral cutting edge.

It should be noted that the above-described (first or second) axial rake angle of the (first or second) end cutting edge is interpreted to mean an angle between a rake face of the end cutting edge and a line parallel to the axis of the cylindrical body, while the radial rake angle of each end cutting edge as described in the above-described Japanese Publication (JP-Y2-2557189) is interpreted to mean an angle between a rake face of the end cutting edge and a radial line passing through the radially outer end of the cutting edge in a plane perpendicular to the axis of the cylindrical body.

According to the second aspect of the invention, in the end mill defined in the first aspect of the invention, the radial rake angle of each of the peripheral cutting edges corresponds to an angle between a rake face of each of the peripheral cutting edges and a radial line passing through each of the peripheral cutting edges in a plane perpendicular to an axis of the cylindrical body, the rake face of each of the peripheral cutting edges being provided by a corresponding one of the plurality of flutes, wherein the axial rake angle of each of the end cutting edges corresponds to an angle between a rake face of each of the end cutting edges and a line parallel to the axis of the cylindrical body, the rake face of each of the end cutting edges being provided by a corresponding one of end gashes which are formed in an axially distal end face of the cylindrical body.

According to the third aspect of the invention, in the end mill defined in the first or second aspect of the invention, the cylindrical body is made of a cemented carbide.

According to the fourth aspect of the invention, in the end mill defined in any one of the first through third aspects of the invention, the axial rake angle of each of the plurality of end cutting edges is not smaller than −2° and is not larger than +10°, while the radial rake angle of each of the plurality of peripheral cutting edges is not smaller than +3° and is not larger than +20°.

According to the fifth aspect of the invention, in the end mill defined in any one of the first through fourth aspects of the invention, the plurality of end cutting edges consist of an even number of end cutting edges, while the plurality of peripheral cutting edges consist of an even number of peripheral cutting edges.

According to the sixth aspect of the invention, in the end mill defined in the fifth aspect of the invention, the even number of end cutting edges consist of the first and second end cutting edges which are alternately arranged as viewed in a circumferential direction of the cylindrical body, while the even number of peripheral cutting edges consist of the first and second peripheral cutting edges which are alternately arranged as viewed in the circumferential direction of the cylindrical body.

According to the seventh aspect of the invention, in the end mill defined in the sixth aspect of the invention, the first axial rake angle of the first end cutting edge is not smaller than −2° and is not larger than +2°, while the second axial rake angle of the second end cutting edge is not smaller than +4° and is not larger than +8°, wherein the first radial rake angle of the first peripheral cutting edge is not smaller than +13° and is not larger than +17°, while the second radial rake angle of the second peripheral cutting edge is not smaller than +4° and is not larger than +8°.

According to the eighth aspect of the invention, in the end mill defined in the fifth aspect of the invention, the even number of end cutting edges consist of at least four end cutting edges which includes another first end cutting edge in addition to above-described first end cutting edge, wherein the two first end cutting edges are located symmetrically with respect to an axis of the cylindrical body, and have respective radially inner ends each of which lies substantially at the axis, and wherein the first axial rake angle of each of the two first end cutting edges is smaller than an axial rake angle of each of the other of the above-described at least four end cutting edges.

According to the ninth aspect of the invention, in the end mill defined in any one of the first through eighth aspects of the invention, the plurality of flutes have respective radially inner ends cooperating with each other to define a core diameter which is constant as viewed in the circumferential direction.

In the end mill defined in any one of the first through ninth aspects of the invention, the plurality of end cutting edges include the first and second end cutting edges whose axial rake angles are different from each other while the plurality of peripheral cutting edges include the first and second peripheral cutting edges whose radial rake angles are different from each other. The first peripheral cutting edge, contiguous to the first end cutting edge having the relatively small axial rake angle, has the relatively large radial rake angle. The second peripheral cutting edge, contiguous to the second end cutting edge having the relatively large axial rake angle, has the relatively small radial rake angle. These arrangements are effective to permit a cutting resistance acting on the end mill to be evenly distributed onto all the cutting edges of the end mill, thereby preventing a chattering of the end mill. Therefore, even in a cutting operation to the heat resistant alloy such as kovar, inconel and stainless steel, the end mill of the invention exhibits an excellent durability without suffering from a chattering and an easy chipping of the cutting edges, and is capable of performing the cutting operation at a sufficiently high feed rate, namely, with a sufficiently high degree of machining efficiency for a practical use.

In the end mill defined in the fourth aspect of the invention, the axial rake angle of each of the plurality of end cutting edges is not smaller than −2° and is not larger than +10°, while the radial rake angle of each of the plurality of peripheral cutting edges is not smaller than +3° and is not larger than +20°. These arrangements are effective to assure high degrees of strength and cutting sharpness of each cutting edge which are required for cutting the heat resistant alloy without suffering from a chattering, and accordingly to provide the end mill with a further improved durability.

In the end mill defined in the sixth aspect of the invention, the even number of end cutting edges consist of the first and second end cutting edges which are alternately arranged as viewed in the circumferential direction, while the even number of peripheral cutting edges consist of the first and second peripheral cutting edges which are alternately arranged as viewed in the circumferential direction. Therefore, at least one first end cutting edge having the relatively small axial rake angle and at least one second end cutting edge having the relatively large axial rake angle are alternately arranged in the circumferential direction, while at least one first peripheral cutting edge having the relatively large radial rake angle and at least one second peripheral cutting edge having the relatively small radial rake angle are alternately arranged in the circumferential direction. These arrangements are effective to assure the even distribution of the cutting resistance on all the cutting edges of the end mill, thereby reliably preventing a chattering of the end mill.

The end mill defined in any one of the first through ninth aspects of the invention can be advantageously used for cutting a workpiece made of a heat resistant alloy such as kovar, inconel and stainless steel. However, the end mill of the invention can be used for a workpiece made of other metallic material, too.

While the plurality of end or peripheral cutting edges consist of the alternately arranged first and second end or peripheral cutting edges in the sixth aspects of the invention the plurality of end or peripheral cutting edges may further include at least one third end or peripheral cutting edge whose rake angle is intermediate between the rake angles of the first and second end or peripheral cutting edge. Where the number of the plurality of flutes is six, it is possible to arrange the first, second and third cutting edges such that the "large" rake angle, "intermediate" rake angle, "small" rake angle, "large" rake angle, "intermediate" rake angle and "small" rake angle are arranged in this order of description in the circumferential direction.

While it is preferable that the rake angles of each pair of end or peripheral cutting edges circumferentially adjacent to each other are different from each other, it is not essential. Where the number of the plurality of flutes is four with a pair of first (end or peripheral) cutting edges and a pair of second (end or peripheral) cutting edges, it is possible to arrange the first and second cutting edges, for example, such that the "large" rake angle, "large" rake angle, "small" rake angle and "small" rake angle are arranged in this order of description in the circumferential direction. Where the number of the plurality of flutes is six, it is possible to arrange the first and second cutting edges, for example, such that the "large" rake angle, "large" rake angle, "small" rake angle, "large" rake angle, "large" rake angle and "small" rake angle are arranged in this order of description in the circumferential direction, or such that the "large" rake angle, "small" rake angle, "small" rake angle, "large" rake angle, "small" rake angle and "small" rake angle are arranged in this order of description in the circumferential direction. Further, the number of the flutes does not have to be necessarily an even number, but may be an odd number.

The ranges of the axial and radial rake angles defined in the fourth and seventh aspects of the invention may be changed or modified as needed, depending upon various factors such as the diameter of the end mill, the number of flutes of the end mill, the work material, the feed rate and other cutting condition.

Each of the peripheral cutting edges preferably consists of a helical cutting edge which is twisted by a helix angle of, for example, 30–50° with respect to the axis of the cylindrical body. The core diameter, which is defined by the radially inner ends of the flutes, is preferably constant as viewed in the circumferential direction in spite of the difference between the radial rake angles of the respective first and second radial rake angles, as in the end mill defined in the eighth aspect of the invention. Although a preferable value of the core diameter varies depending upon the cutter or mill diameter D and the number of cutting edges, the preferable value of the core diameter is not smaller than 0.6 D and is not larger than 0.7 D where the mill diameter D is not larger than 10 mm.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which.

DETAILED DESCRIPTION OF THE PREFERRED EMBODIMENT

Figure 1A:
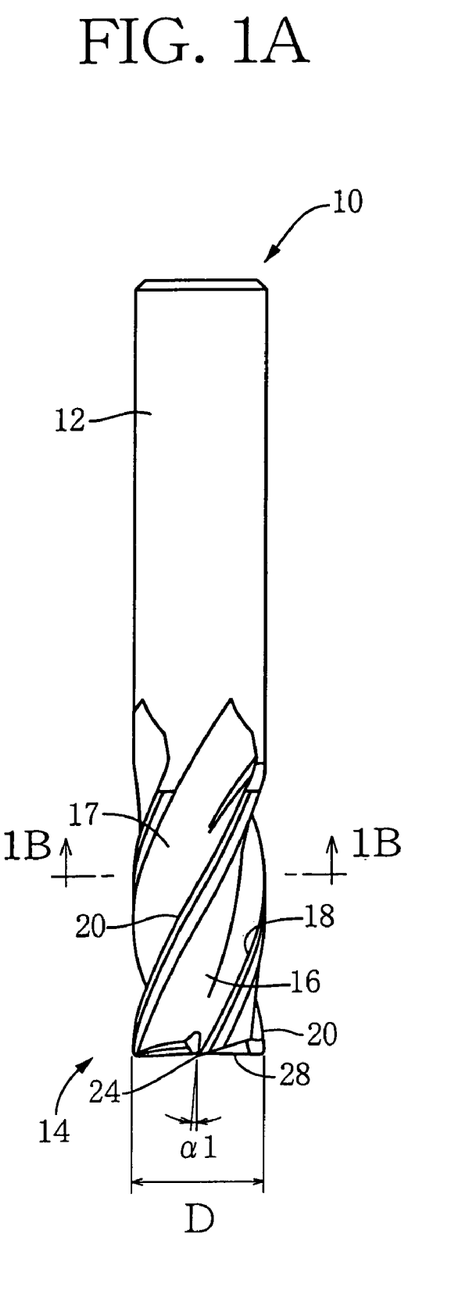
FIG. 1A is a front elevational view of four-flute square end mill which is constructed according to an embodiment of this invention.
Figure 1B:
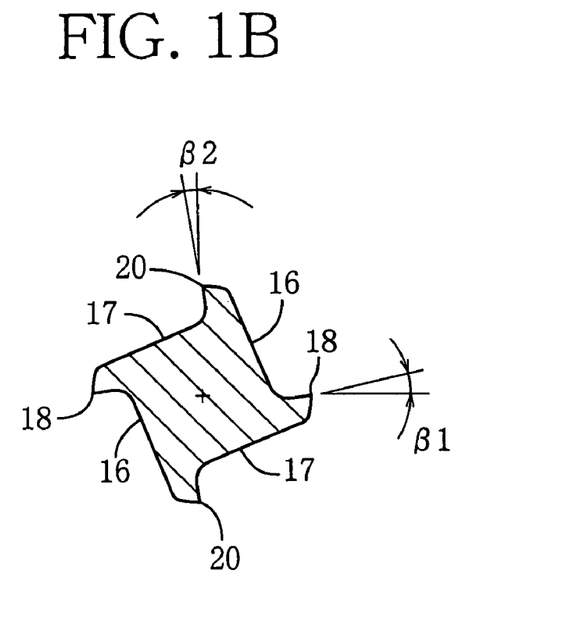
FIG. 1B is a cross sectional view taken along line 1B—1B of FIG. 1A, i.e., taken in a plane perpendicular to an axis of the end mill.
Figure 1C:
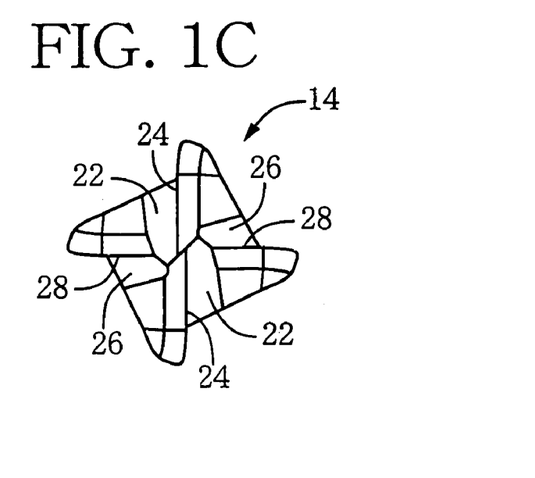
FIG. 1C is a bottom view of the end mill of FIG. 1A.
Figure 1D:
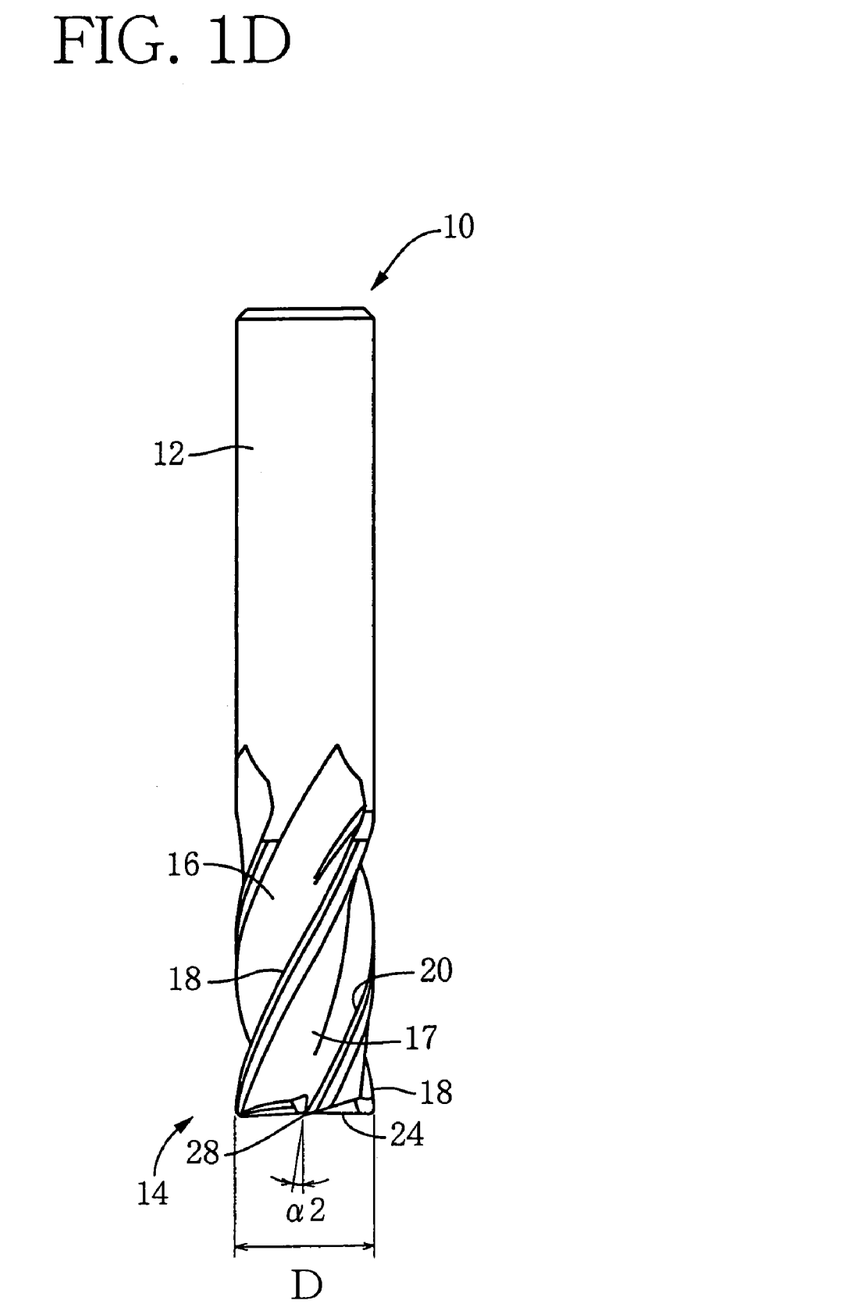
FIG. 1D is a side elevational view of the end mill of FIG. 1A.

Referring first to FIGS. 1A–1D, there will be described a four-flute square end mill 10 which is constructed according to an embodiment of this invention. FIG. 1A is a front elevational view of the end mill 10. FIG. 1B is a cross sectional view taken along line 1B—1B of FIG. 1A. FIG. 1C is a bottom view of the end mill 10. FIG. 1D is a side elevational view of the end mill 10, in other words, a front elevational view of the end mill 10 as rotated by 90° about its axis from its angular position of FIG. 1A. This end mill 10 is provided by a cylindrical body made of a cemented carbide. The cylindrical body has a shank portion 12 and a fluted portion 14 which are coaxial with each other. Four helical flutes 16, 17 are formed in an outer circumferential surface of the fluted portion 14 such that the four helical flutes 16 are located around the axis and are equi-angularly spaced apart from each other at an angular interval of 90°. Four peripheral cutting edges 18, 20 are formed along the respective four helical flutes 16, 17. That is, each of the four peripheral cutting edges 18, 20 is provided by one of widthwise opposite edges of the corresponding one of the four helical flutes 16, 17. The four peripheral cutting edges 18, 20 intersect with respective four end cutting edges 24, 28 at an axially distal end of the cylindrical body, i.e., at corners of the cylindrical body (each of which is slightly rounded to have a radius R of curvature of about 0.45 mm).

Like the four peripheral cutting edges 18, 20, the four end cutting edges 24, 28 are equi-angularly spaced apart from each other at an angular interval of 90°. The four end cutting edges 24, 28 consist of a pair of first end cutting edges 24 and a pair of second end cutting edges 28 such that the first and second end cutting edges 24, 28 are alternately arranged as viewed in a circumferential direction of the cylindrical body of the end mill 10. The first and second end cutting edges 24, 28 are defined by first and second end gashes 22, 26 which are formed in an axially distal end face of the cylindrical body. Described more specifically, the first end cutting edges 24 are respectively defined by the pair of first end gashes 22 which are arranged symmetrically with respect to the axis, while the second end cutting edges 28 are respectively defined by the pair of second end gashes 26 which are arranged symmetrically with respect to the axis. Each of the pair of first end gashes 22 radially inwardly extends away from the periphery of the cylindrical body over such a distance that permits a corresponding one of the first end cutting edges 24 to extend so as to substantially reach the axis of the cylindrical body. Each of the pair of second end gashes 26 radially inwardly extends away from the periphery of the cylindrical body over such a distance that permits the second end gash 26 to communicate with a corresponding one of the first end gashes 22. It is noted that the first and second end gashes 22, 26 can be formed in a grinding operation, for example, with a diamond grinding wheel. It is also noted that each of the first end cutting edges 24, having a radially inner end lying substantially at the axis of the cylindrical body, serves as a so-called "center cutting edge".

Each of the first end gashes 22 constitutes a rake face of a corresponding one of the first end cutting edges 24, while each of the second end gashes 26 constitutes a rake face of a corresponding one of the second end cutting edges 28. Each first end gash 22 is concaved in a direction parallel to the axis of the cylindrical body or in a direction inclined with respect to the axis by a predetermined angle such that the rake face of the corresponding first end cutting edge 24 has a predetermined axial rake angle $\alpha 1$ as shown in FIG. 1A. Similarly, each second end gash 26 is concaved in a direction parallel to the axis of the cylindrical body or in a direction inclined with respect to the axis by a predetermined angle such that the rake face of the corresponding second end cutting edge 28 has a predetermined axial rake angle $\alpha 2$ as shown in FIG. 1D. In the present embodiment, the rake face of each first end cutting edge 24, serving as the center cutting edge, has the axial rake angle al which is not smaller than −2° and is not larger than +2° (preferably 0°), while the rake face of each second end cutting edge 28 has the axial rake angle $\alpha 2$ which is not smaller than +4° and is not larger than +8° (preferably +6°). Since the first and second end cutting edges 24, 28 are alternately arranged in the circumferential direction as described above, the relatively small axial rake angles $\alpha 1$ and the relatively large axial rake angles $\alpha 2$ are alternately arranged in the circumferential direction. It is noted that FIG. 1A illustrates a case where the axial rake angle al has a positive value although the preferred value of the axial rake angle $\alpha 1$ is 0°.

Like the four end cutting edges 24, 28, the four peripheral cutting edges 18, 20 consist of a pair of first peripheral cutting edges 18 and a pair of second peripheral cutting edges 20 such that the first and second peripheral cutting edges 18, 20 are alternately arranged as viewed in the circumferential direction of the cylindrical body of the end mill 10, such that the first peripheral cutting edges 18 are contiguous to the respective first end cutting edges 24 while the second peripheral cutting edges 20 are contiguous to the respective second end cutting edges 28. Similarly, the four helical flutes 16, 17 consist of a pair of first flutes 16 and a pair of second flutes 17 such that the first and second flutes 16, 17 are alternately arranged as viewed in the circumferential direction. Each of the first flutes 16 constitutes a rake face of a corresponding one of the first peripheral cutting edges 18, while each of the second flutes 17 constitutes a rake face of a corresponding one of the second peripheral cutting edges 20. The rake face of each first peripheral cutting edge 18, contiguous to the corresponding first end cutting edge 24, has a first radial rake angle β1 which is not smaller than +13° and is not larger than +17° (preferably +15°). The rake face of each second peripheral cutting edge 20, contiguous to the corresponding second end cutting edge 28, has a second radial rake angle β2 which is not smaller than +4° and is not larger than +8° (preferably 6°).

A core diameter of the end mill 10, which is defined by radially inner ends of the flutes 16, 17, is substantially constant as viewed in the circumferential direction, in spite of the difference between the values of the first and second radial rake angles β1, β2. In the present embodiment, the cutter or mill diameter D is about 6.35 mm while the core diameter is about 0.65 D. Each of the helical flutes 16, 17 is twisted by a helix angle γ of about 40° with respect to the axis of the cylindrical body. The fluted portion 14 of the cylindrical body is coated with a hard coating formed of, for example, TiAlN. It should be noted that FIGS. 1A–1D do not necessarily show various parts or elements, with exact representation of ratios of their dimensions.

Figure 2A:
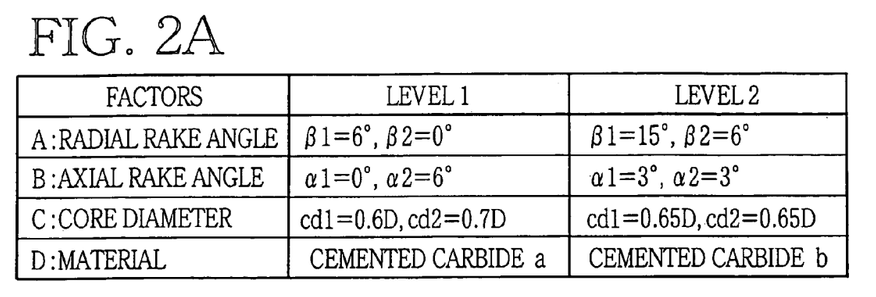
FIG. 2A is a table showing factors and levels determined in an empirical manner.
Figure 2B:
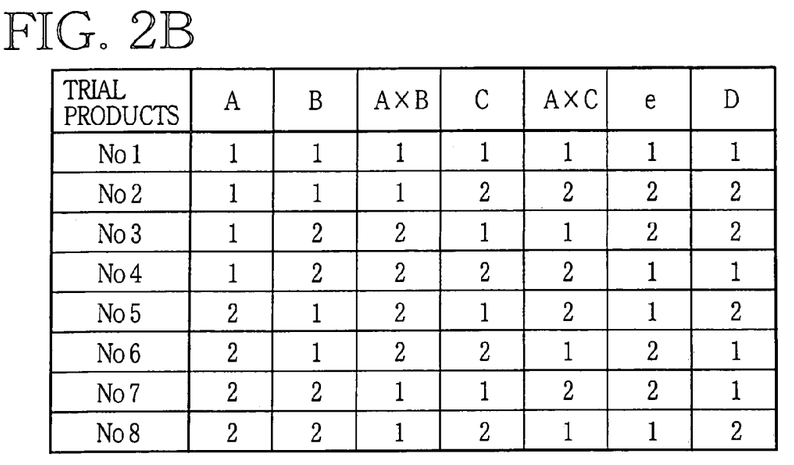
FIG. 2B is a table showing the selected levels for the respective factors in each of trial products Nos. 1–8.
Figure 2C:
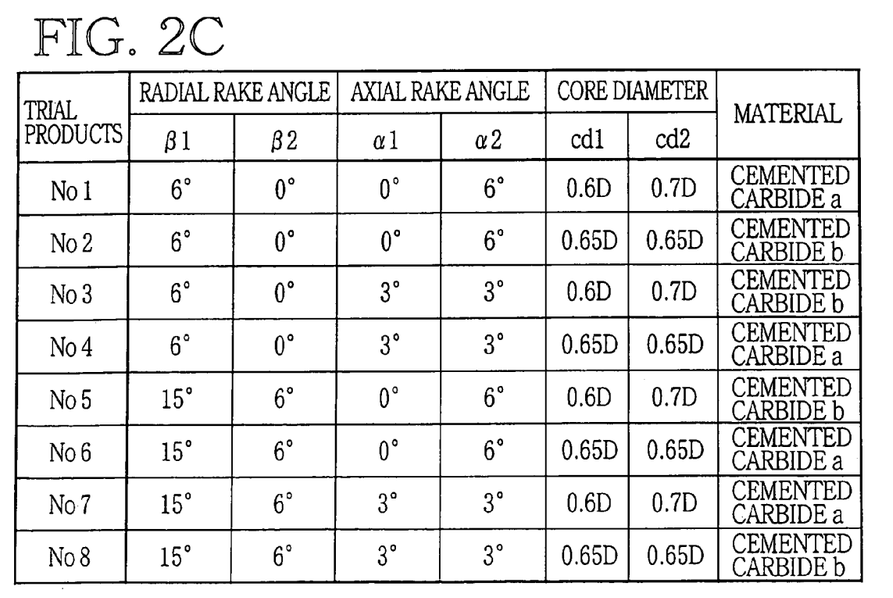
FIG. 2C is a table showing design data of the trial products Nos. 1–8.

The end mill 10 has a construction having an optimum combination of various factors, which combination is determined as a result of evaluations of performances of trial products. FIGS. 2A–2C are tables for explaining the trial products which were produced in accordance with an experimental design. The table of FIG. 2A shows the factors A, B, C, D and the levels 1, 2 determined in an empirical manner. The table of FIG. 2B shows the levels selected for the respective factors in each of the trial products Nos. 1–8. The table of FIG. 2C specifically shows design data of each of the trial products Nos. 1–8. The "radial rake angle" of the factor A represents the radial rake angle of each peripheral cutting edge. In the factor A, β1 represents the first radial rake angle of each first peripheral cutting edge 18 contiguous to the corresponding first end cutting edge 24, while β2 represents the second radial rake angle of each second peripheral cutting edge 20 contiguous to the corresponding second end cutting edge 28. The "axial rake angle" of the factor B represents the axial rake angle of each end cutting edge. In the factor B, α1 represents the first axial rake angle of each first end cutting edge 24, while α2 represents the second axial rake angle of each second end cutting edge 28. The "core diameter" of the factor C represents the core diameter defined by the radially inner ends of the respective flutes 16, 17. In the factor C, cd1 represents the core diameter as measured at the radially inner ends of the diametrically opposed flutes 16 which provide the rake faces of the first peripheral cutting edges 18, namely, represents the distance between the radially inner ends of the diametrically opposed flutes 16, while cd2 represents the core diameter as measured at the radially inner ends of the diametrically opposed flutes 17 which provide the rake faces of the second peripheral cutting edges 20, namely, represents the distance between the radially inner ends of the diametrically opposed flutes 17. The "material" of the factor D represents the material of which the body of the end mill is made. In the factor D, cemented carbide a and cemented carbide b are different, in cobalt content, from each other. The cemented carbide a has a lower content of cobalt than the cemented carbide b. It is noted that the mill diameter and the helix angle γ of the peripheral cutting edges of each trial products are about 6.35 mm and about 40°.

Figure 3:
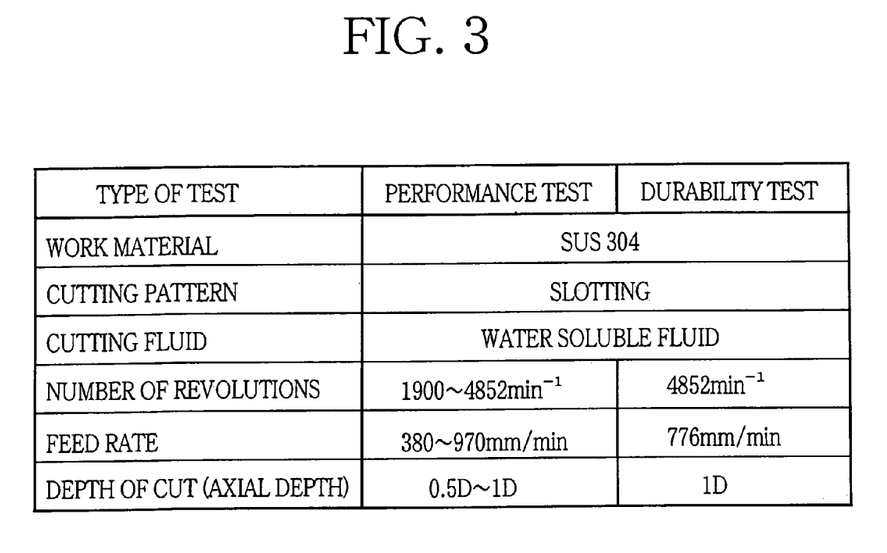
FIG. 3 is a table showing cutting conditions of a performance test and a durability test which were conducted with the trail products Nos. 1–8.
Figure 4:
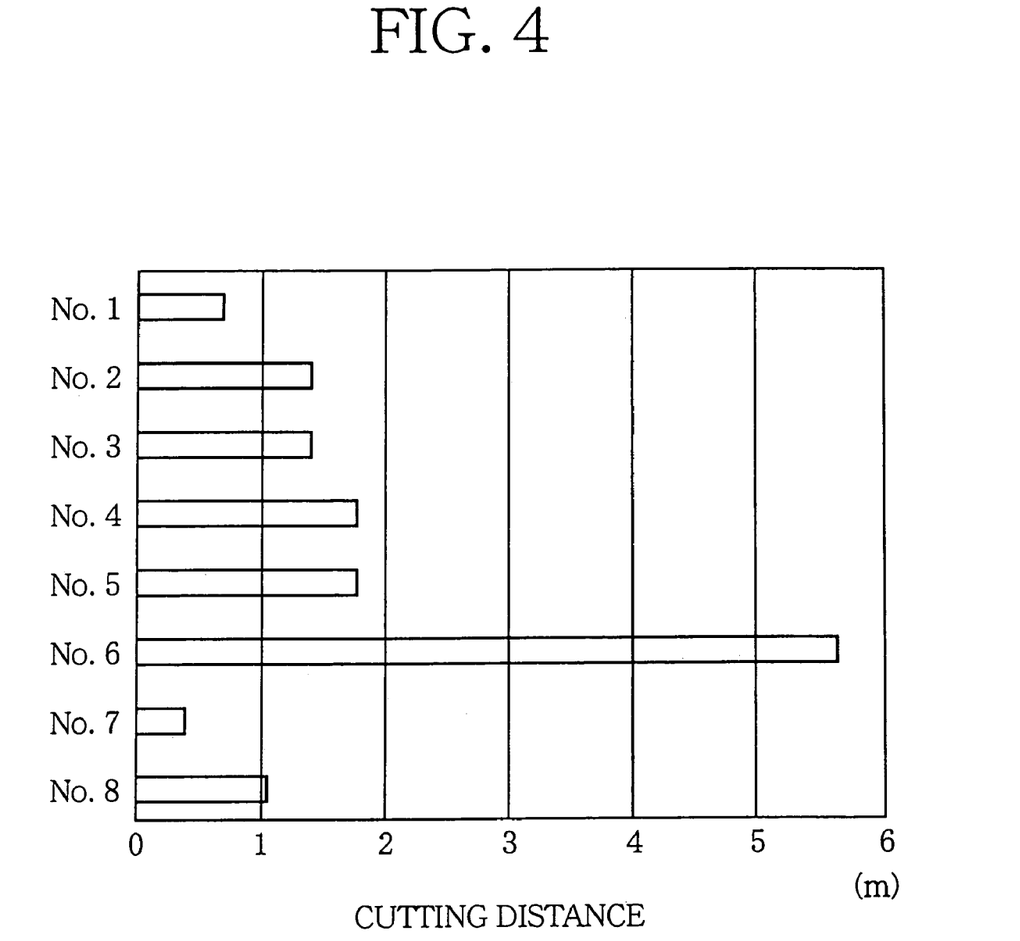
FIG. 4 is a graph showing a result of the durability test.
Figure 5:
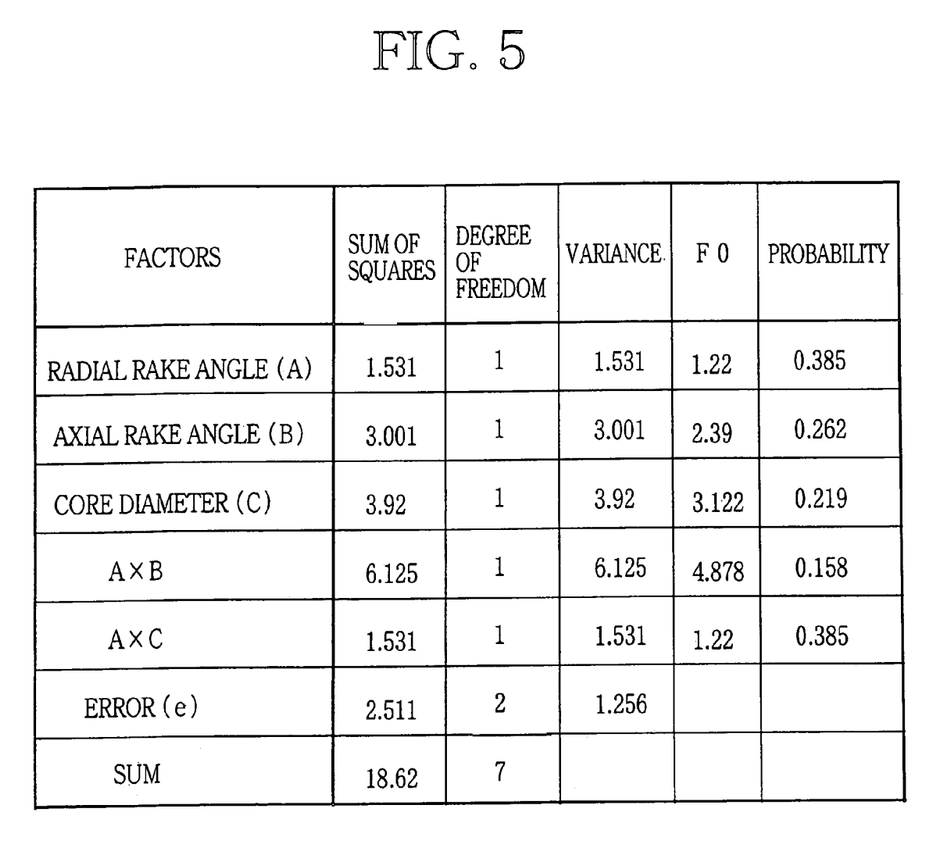
FIG. 5 is a table showing an analysis of variance which was obtained from the results of the tests.

By using the trial products Nos.1–8, a performance test and a durability test were conducted under cutting condition specified in FIG. 3. The performing test was conducted by evaluating the performance of each trial product in view of noises and vibrations generated in the cutting operation. In the performance test, the trial products No.3, No.5, No.6 and No.8 exhibited "excellent" cutting performances; the trial products No.2, No.4 and No.7 exhibited "fair" cutting performances; and the trial product No.1 exhibited "poor" cutting performance. The durability test was conducted by measuring an accumulative distance, over which a work material had been cut by each trial product, at a point of time at which the tool life of each trial product was over due to its excessive wear or chipping. In the durability test, the trial product No.6 exhibited "excellent" durability as shown in FIG. 4. FIG. 5 is a table indicating an analysis of variance which was obtained from the results of the tests. The construction of the end mill 10 was designed in view of the results of the tests. With respect to the factor D (material), it was not confirmed which one of the levels 1, 2 (cemented carbides a, b) was advantageous over the other.

Figure 6:
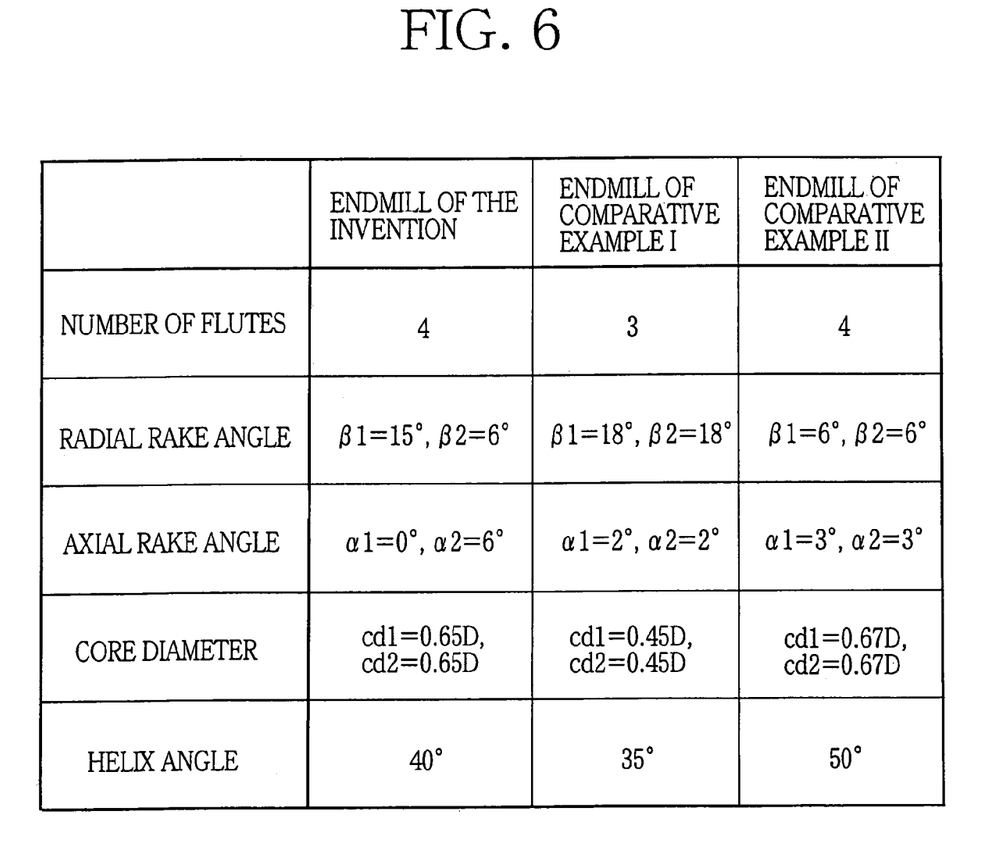
FIG. 6 is a table showing design data of the end mills of the present invention and comparative examples I, II which were used in a durability test.
Figure 7:
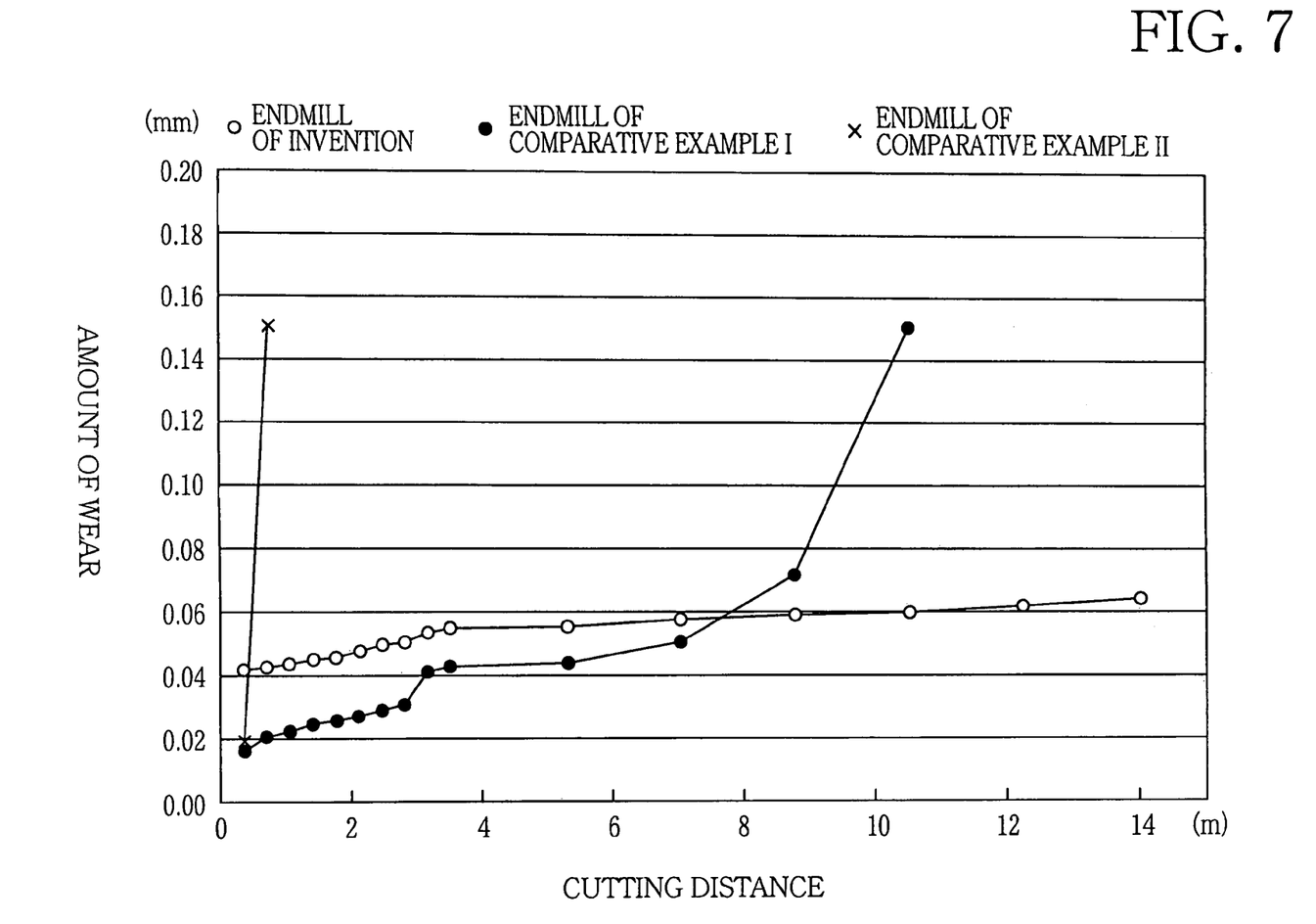
FIG. 7 is a graph showing a result of the durability test with the end mills of FIG. 6.

Another durability test was conducted by using the end mill 10 (identical with the above-described trial product No.6) of the invention and end mills of comparative examples I, II, as shown in FIG. 6. In the end mills of the comparative examples, the peripheral cutting edges have radial rake angles β1, β2 which are equal to one another, and the end cutting edges have axial rake angles α1, α2 which are equal to one another. As shown in FIG. 7, the end mill 10 of the invention is capable of cutting the work material over a larger distance with a smaller amount of wear, than the end mills of comparative examples I, II.

[Cutting Condition]
Work material: SUS304
Number of revolutions: 2650 min$^{-1}$
Feed rate: 398 mm/min
Depth of cut (axial depth): 0.5 D
Cutting fluid: Water soluble fluid In the end mill 10 constructed as described above, the axial rake angles α1, α2 of the alternately arranged first and second end cutting edges 24, 28 are different from each other while the radial rake angles β1, β2 of the alternately arranged first and second peripheral cutting edges 18, 20 are different from each other. The first peripheral cutting edges 18, contiguous to the first end cutting edges 24 having the relatively small axial rake angles α1, have the relatively large radial rake angles β1. The second peripheral cutting edges 20, contiguous to the second end cutting edges 28 having the relatively large axial rake angles α2, have the relatively small radial rake angles β2. These arrangements are effective to permit a cutting resistance acting on the end mill 10 to be evenly distributed onto all the cutting edges of the end mill 10, thereby preventing a chattering of the end mill 10. Therefore, even in a cutting operation to the heat resistant alloy such as kovar, inconel and stainless steel, the end mill 10 of the invention exhibits an excellent durability without suffering from a chattering and an easy chipping of the cutting edges, and is capable of performing the cutting operation at a sufficiently high feed rate, namely, with a sufficiently high degree of machining efficiency for a practical use.

Further, in the end mill 10 of the invention, the first and second axial rake angles α1, α2 of the first and second end cutting edges 24, 28 are not smaller than −2° and are not larger than +10°, while the first and second radial rake angles β1, β2 of the first and second peripheral cutting edges 18, 20 are not smaller than +3° and are not larger than +20°. These arrangements are effective to assure high degrees of strength and cutting sharpness of each cutting edge which are required for cutting the heat resistant alloy without suffering from a chattering, and accordingly to provide the end mill 10 with a further improved durability.

Further, in the end mill 10 of the invention, the alternately arranged first and second end cutting edges 24, 28 have the relatively small and large axial rake angles α1, α2, while the alternately arranged first and second peripheral cutting edges 18, 20 have the relatively large and small radial rake angles β1, β2. Therefore, the relatively small and large axial rake angles α1, α2 are alternately arranged in the circumferential direction. Similarly, the relatively large and small radial rake angles β1, β2 are alternately arranged in the circumferential direction. These arrangements are effective to assure the even distribution of the cutting resistance on all the cutting edges of the end mill 10, thereby reliably preventing a chattering of the end mill.

While the presently preferred embodiment of the present invention have been illustrated above, it is to be understood that the invention is not limited to the details of the illustrated embodiment, but may be embodied with various other changes, modifications and improvements, which may occur to those skilled in the art, without departing from the spirit and scope of the invention defined in the following claims.

What is claimed is:

1. An end mill, comprising:
a cylindrical body having (a) a plurality of flutes each of which is formed in said cylindrical body and each of which extends from an axially distal end of said cylindrical body toward an axially proximal end of said cylindrical body, (b) a plurality of peripheral cutting edges each of which is provided by one of widthwise opposite edges of a corresponding one of said plurality of flutes, and (c) a plurality of end cutting edges each of which is located at said axially distal end of said cylindrical body and is contiguous to a corresponding one of said plurality of peripheral cutting edges, wherein
said plurality of end cutting edges include first and second end cutting edges, said plurality of peripheral cutting edges include first and second peripheral cutting edges which are contiguous to said first and second end cutting edges, respectively,
said first and second end cutting edges have a predetermined first axial rake angle and a predetermined second axial rake angle, respectively, said first and second peripheral cutting edges have a predetermined first radial rake angle and a predetermined second radial rake angle, respectively,
and the predetermined first axial rake angle of said first end cutting edge is smaller than the predetermined second axial rake angle of said second end cutting edge, the predetermined first radial rake angle of said first peripheral cutting edge is larger than the predetermined second radial rake angle of said second peripheral cutting edge.

2. An end mill according to claim 1,
wherein the radial rake angle of each of said peripheral cutting edges corresponds to an angle between a rake face of each of said peripheral cutting edges and a radial line passing through said each of said peripheral cutting edges in a plane perpendicular to an axis of said cylindrical body, said rake face of each of said peripheral cutting edges being provided by a corresponding one of said plurality of flutes,
and wherein the axial rake angle of each of said end cutting edges corresponds to an angle between a rake face of each of said end cutting edges and a line parallel to the axis of said cylindrical body, said rake face of each of said end cutting edges being provided by a corresponding one of end gashes which are formed in an axially distal end face of said cylindrical body.

3. An end mill according to claim 1,
wherein said cylindrical body is made of a cemented carbide.

4. An end mill according to claim 1,
wherein the axial rake angle of each of said plurality of end cutting edges is not smaller than −2° and is not larger than +10°,
and wherein the radial rake angle of each of said plurality of peripheral cutting edges is not smaller than +3° and is not larger than +20°.

5. An end mill according to claim 1,
wherein said plurality of end cutting edges consist of an even number of end cutting edges,
and wherein said plurality of peripheral cutting edges consist of an even number of peripheral cutting edges.

6. An end mill according to claim 5,
wherein said even number of end cutting edges consist of said first and second end cutting edges which are alternately arranged as viewed in a circumferential direction of said cylindrical body,
and wherein said even number of peripheral cutting edges consist of said first and second peripheral cutting edges which are alternately arranged as viewed in the circumferential direction of said cylindrical body.

7. An end mill according to claim 5,
wherein said even number of end cutting edges consist of at least four end cutting edges which includes another first end cutting edge in addition to said first end cutting edge,
wherein the two first end cutting edges are located symmetrically with respect to an axis of said cylindrical body, and have respective radially inner ends each of which lies substantially at said axis,
and wherein said first axial rake angle of each of said two first end cutting edges is smaller than an axial rake angle of each of the other of said at least four end cutting edges.

8. An end mill according to claim 1,
wherein said plurality of flutes have respective radially inner ends cooperating with each other to define a core diameter which is constant as viewed in a circumferential direction of said cylindrical body.

9. An end mill comprising:
a cylindrical body having (a) a plurality of flutes each of which is formed in said cylindrical body and each of which extends from an axially distal end of said cylindrical body toward an axially proximal end of said cylindrical body, (b) a plurality of peripheral cutting edges each of which is provided by one of widthwise opposite edges of a corresponding one of said plurality of flutes, and (c) a plurality of end cutting edges each of which is located at said axially distal end of said cylindrical body and is contiguous to a corresponding one of said plurality of peripheral cutting edges, wherein said plurality of end cutting edges include first and second end cutting edges, said plurality of peripheral cutting edges include first and second peripheral cutting edges which are contiguous to said first and second end cutting edges, respectively, a first axial rake angle of said first end cutting edge is smaller than a second axial rake angle of said second end cutting edge, a first radial rake angle of said first peripheral cutting edge is larger than a second rake angle of said second peripheral cutting edge, said plurality of end cutting edges consist of an even number of end cutting edges, said plurality of peripheral cutting edges consist of an even number of peripheral cutting edges, said even number of end cutting edges consist of said first and second end cutting edges which are alternately arranged as viewed in a circumferential direction of said cylindrical body, said even number of peripheral cutting edges consist of said first and second peripheral cutting edges which are alternately arranged as viewed in the circumferential direction of said cylindrical body, said first axial rake angle of said first end cutting edge is not smaller than $-2°$ and is not larger than $+2°$, while said second axial rake angle of said second end cutting edge is not smaller than $+4°$ and is not larger than $+8°$, and said first radial rake angle of said first peripheral cutting edge is not smaller than $+13°$ and is not larger than $+17°$, while said second radial rake angle of said second peripheral cutting edge is not smaller than $+4°$ and is not larger than $+8°$.

* * * * *